US012478548B2

(12) United States Patent
Nagasawa

(10) Patent No.: US 12,478,548 B2
(45) Date of Patent: Nov. 25, 2025

(54) SAUNA SYSTEM

(71) Applicant: AMAHAYAMI INC., Ueda (JP)

(72) Inventor: Takaki Nagasawa, Ueda (JP)

(73) Assignee: AMAHAYAMI INC., Ueda (JP)

( * ) Notice: Subject to any disclaimer, the term of this patent is extended or adjusted under 35 U.S.C. 154(b) by 0 days.

(21) Appl. No.: 18/561,623

(22) PCT Filed: Dec. 9, 2022

(86) PCT No.: PCT/JP2022/045413
§ 371 (c)(1),
(2) Date: Nov. 16, 2023

(87) PCT Pub. No.: WO2023/136001
PCT Pub. Date: Jul. 20, 2023

(65) Prior Publication Data

US 2024/0245579 A1 Jul. 25, 2024

(30) Foreign Application Priority Data

Jan. 12, 2022 (JP) ................................. 2022-002949
Sep. 26, 2022 (JP) ................................. 2022-152941

(51) Int. Cl.
*A61H 33/06* (2006.01)
*F24F 6/12* (2006.01)
*F24F 6/18* (2006.01)

(52) U.S. Cl.
CPC ............. *A61H 33/066* (2013.01); *F24F 6/12* (2013.01); *F24F 6/18* (2013.01); *A61H 2033/068* (2013.01)

(58) Field of Classification Search
CPC .................... A61H 33/065; A61H 33/066–067
See application file for complete search history.

(56) References Cited

U.S. PATENT DOCUMENTS 4,833,739 A 5/1989 Sakakibara et al.
2010/0024117 A1* 2/2010 Fujii ...................... A61H 33/10 4/524
2025/0127682 A1* 4/2025 Turri .................... A61H 33/067

FOREIGN PATENT DOCUMENTS

CN 102178597 A 9/2011
CN 102178597 B * 11/2012
DE 86 60 083 U1 7/1987
JP 63-238864 A 10/1988
JP 02-102653 A 4/1990
JP 5-9544 U 2/1993

(Continued)

OTHER PUBLICATIONS

International Search Report (PCT/ISA/210), issued in PCT/JP2022/045413, dated Feb. 21, 2023.

(Continued)

*Primary Examiner* — Christine J Skubinna
(74) *Attorney, Agent, or Firm* — Birch, Stewart, Kolasch & Birch, LLP

(57) ABSTRACT

The problem of dew condensation inside a sauna room is prevented and air inside the sauna room is enabled to circulate in a power-saving mode with a sauna system including a sauna room having a space that a user can enter/exit; a steam supply pipe for supplying steam into the sauna room; and a fluid circulation generation device disposed at a predetermined position inside the sauna room. The fluid circulation generation device circulates steam inside the sauna room in the vertical direction.

10 Claims, 16 Drawing Sheets

(56) References Cited

FOREIGN PATENT DOCUMENTS

| | | | | |
|---|---|---|---|---|
| JP | H059544 | U | * | 2/1993 |
| JP | 9-182776 | A | | 7/1997 |
| JP | 2002-35080 | A | | 2/2002 |
| JP | 2015-524692 | A | | 8/2015 |
| TW | M263104 | U | | 5/2005 |

OTHER PUBLICATIONS

Finnish Office Action and Search Report issued in Finnish Application No. 20245944, dated Feb. 28, 2025.

* cited by examiner

SAUNA SYSTEM

TECHNICAL FIELD

The present invention relates to sauna systems, and in particular to wet-type sauna systems.

BACKGROUND ART

As saunas, there are dry-type saunas with high temperature and low humidity and wet-type saunas with low temperature and high humidity using steam and mist.

For example, PTL1 (Japanese Patent Application Laid-open No. 2015-524692) discloses a mist sauna device equipped with a circulating air blower that circulates air inside a sauna room, a heating device that heats the air, and a humidifier that humidifies the air.

In wet-type saunas, as dew condensation on the ceiling or the like may become a problem, PTL2 (Japanese Patent Application Laid-open No. 2002-035080) discloses the installation of a circulator on the wall surface of the sauna room of the wet-type sauna so as to improve the temperature distribution inside the room and also lower the temperature of water droplets of dew condensation produced on the ceiling area.

CITATION LIST

Patent Literature

PTL1: Japanese Patent Application Laid-open No. 2015-524692

PTL2: Japanese Patent Application Laid-open No. 2002-035080

SUMMARY OF INVENTION

Technical Problems

PTL2 states that the circulator is installed on the wall surface of the sauna room so as to circulate the air inside the sauna room and lower the temperature of dew condensation produced on the ceiling area, so that discomfort or burn is not caused even if dropped water droplets hit.

However, even with the configuration of PTL2, there has been a problem in that the dew condensation cannot be eliminated completely and the dew condensation causes damage to the ceiling and wall surfaces.

In addition, PTL2 uses the circulator to generate the flow of air, but it does not disclose how the air is circulated, and thus driving the circulator to circulate the air may increase the cost of electricity and others.

Therefore, when trying to circulate the air inside the sauna room, there has also been a problem in that circulating the air in a power-saving mode is desirous.

Solution to Problems

The present invention has been made to solve the above-described problems, and an object thereof is to provide a sauna system capable of preventing dew condensation inside a sauna room of a wet-type sauna and circulating the air inside the sauna room in a power-saving mode.

A sauna system of the present invention includes a sauna room having a space in which a user is able to enter and exit, a steam supply pipe configured to supply steam into the sauna room, and a fluid circulation generation device disposed at a predetermined position inside the sauna room, and the fluid circulation generation device is configured to circulate steam in the vertical direction in the sauna room.

By employing this configuration, steam is circulated in the vertical direction (that is, moving back and forth between the ceiling and floor) in the sauna room, so that dew condensation on the ceiling and wall surfaces of the sauna room can be prevented. In addition, because steam is circulated in the vertical direction, as compared with the case in which steam is circulated in random directions, power-saving mode can be achieved.

Furthermore, the fluid circulation generation device may have a cooling tower in which water flows downward from a top to a bottom, and a water supply pipe configured to supply water to the top of the cooling tower.

With this configuration, steam inside the sauna room is cooled by coming into contact with the cooling tower, and the cooled steam descends. Thus, steam circulates in the vertical direction in the sauna room. In addition, because some of the moisture contained in the steam for which the temperature has lowered in contact with the cooling tower flows down together with the water flowing down the cooling tower, dew condensation on the ceiling and wall surfaces of the sauna room can be prevented. Moreover, a sauna system that does not use electricity for circulating steam can be implemented.

The cooling tower may have a plurality of receiver portions arranged at predetermined intervals in the vertical direction, and a plurality of support columns supporting the outer circumferential edges of the receiver portions, and the receiver portions may have a plurality of water passage holes for causing water flowed out from the water supply pipe to drop.

The water passage holes in the receiver portions may be formed such that vertical axes are inclined clockwise or counterclockwise when viewed in planar view.

With this configuration, water falling down from the receiver portion falls inclined at a clockwise or counterclockwise angle. At this time, the steam in the sauna room that is in contact with this falling water also follows the water falling down from the receiver portion and becomes a flow in a direction rotating clockwise or counterclockwise, so that the steam can circulate in a direction rotating around the cooling tower.

The water supply pipe may be disposed through the center of the receiver portions from a lower side toward an upper side, and an opening may be provided above an uppermost one of the receiver portions.

With this configuration, water flowing out from the water supply pipe can be reliably dropped downward through the receiver portions.

The fluid circulation generation device may have a first transport pipe configured to discharge gas from a lower portion of the sauna room into the sauna room and a second transport pipe configured to suck gas inside the sauna room from an upper portion of the sauna room, and the gas discharged from the first transport pipe may have a temperature lower than a room temperature of the sauna room.

With this configuration, steam rises between the first transport pipe and the second transport pipe, but has a lower temperature toward the lower portion of the sauna room, and thus the steam circulates in the vertical direction in the sauna room. As a result, dew condensation on the ceiling and wall surfaces of the sauna room can be prevented.

The fluid circulation generation device may have an ultrasonic atomization device provided in an upper portion of the sauna room, and the ultrasonic atomization device may be configured to circulate steam in the vertical direction in the sauna room by condensing steam in the sauna room and causing droplets to fall from the upper portion of the sauna room.

With this configuration, the steam in the upper portion of the sauna room is condensed by the ultrasonic atomization device and descends (drops) as droplets. Thus, steam circulates in the vertical direction in the sauna room. As a result, dew condensation on the ceiling and wall surfaces of the sauna room can be prevented.

The sauna room may have a floor surface formed in a drainboard shape, the steam supply pipe may have a steam discharge hole disposed below the floor surface in the drainboard shape and formed so as to discharge steam downward, and a ceramic plate that is disposed below the steam supply pipe and on which steam discharged from the discharge hole of the steam supply pipe abuts may be provided.

With this configuration, by supplying steam from the lower side of the sauna room, the high-temperature steam reliably rises in the sauna room, so that temperature averaging in the sauna room can be achieved, and further, the steam is once directed downward to abut on the ceramic plate, so that the steam from the steam supply pipe does not hit the human body directly and burns and the like can be prevented. In addition, as the ceramic plate is heated by steam, the effect of far-infrared rays emitted from the ceramic plate can also be obtained.

The sauna room may be formed in a polygonal shape in planar view, and the cooling tower may be disposed at the center of the polygon.

With this configuration, steam can circulate in the space between the center of the sauna room and the wall surfaces of the sauna room.

Each space separated by straight lines extending from a vertex of the polygonal shape toward the center of the polygon may be provided as a usage space for a user.

Advantageous Effects of Invention

According to the present invention, while preventing dew condensation inside a sauna room, circulation of the air inside the sauna room can be performed in a power-saving mode.

DESCRIPTION OF EMBODIMENTS

First, an overview of a sauna system in each embodiment will be described. The sauna system in each embodiment is what is called a wet-type sauna system, which may be either an infrastructure type that takes a power or water source externally, or an off-grid type that does not need an external power or external water source.

Then, an overview of a sauna room 10 or 44 in each embodiment will be described. The sauna room 10 or 44 in each embodiment, in the above-described sauna system, has a space that a sauna user can enter and exit and may be provided as a room (especially a separate room) in a predetermined location such as a bathhouse, or may be an independent building, mobile sauna room, and the like. Either of the sauna rooms can be implemented with the above-described infrastructure type or off-grid type.

Next, an overview of a fluid circulation generation device 100 in the present invention will be described. Although the specific configuration of the fluid circulation generation device 100 in each embodiment differs, in all cases, the circulation of steam in the vertical direction is generated, by combining the rise of steam and the movement (ascent or descent) of fluid (liquid or gas) performed by the fluid circulation generation device 100.

"Circulation in the vertical direction" means that steam circulates between the ceiling and the floor of the sauna room 10 or 44 so that the fluid moves (ascends or descends) by the fluid circulation generation device 100 and moves in the opposite direction (descends or ascends) on the wall surface side of the sauna room 10 and 44.

First Embodiment

Figure 1:
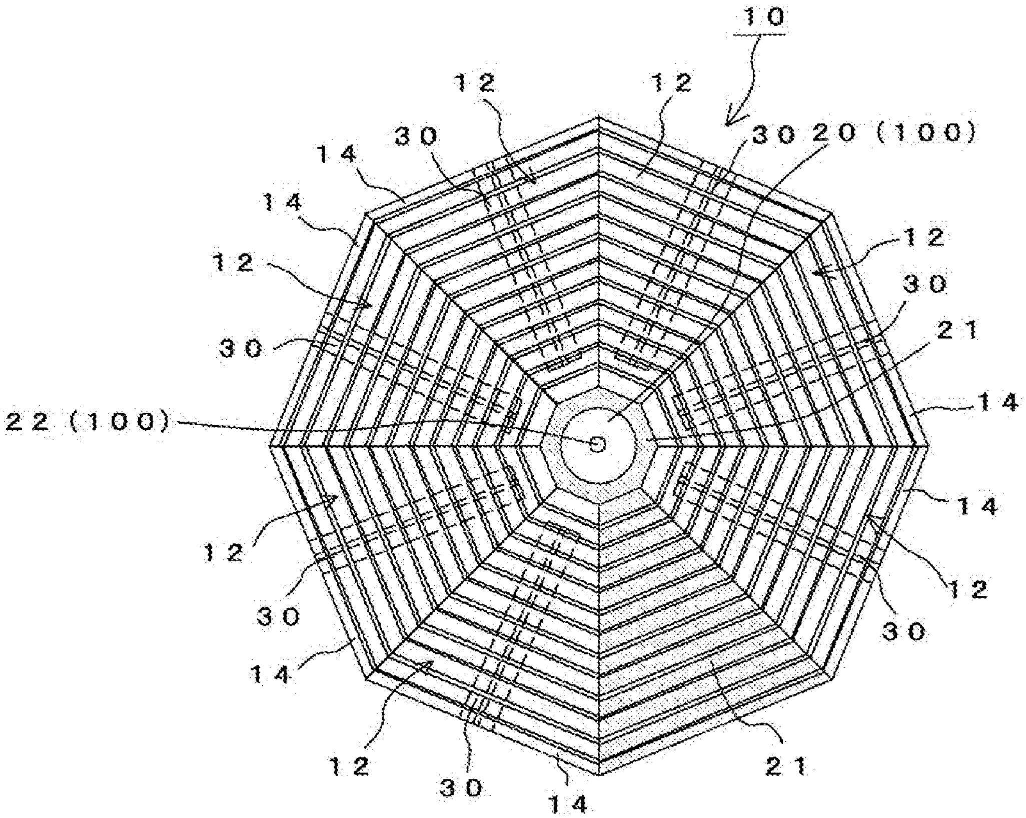
FIG. 1 is a plan view of a sauna room in a sauna system of a first embodiment.

FIG. 1 illustrates a plan view of an entire sauna room 10 of a first embodiment. The sauna room 10 in the present embodiment has a regular octagonal shape in planar view. However, the shape of the sauna room 10 is not limited to a regular octagonal shape in planar view.

A space 12 separated by straight lines extending from the vertex of the regular octagon of the sauna room 10 toward the center of the octagon is configured as a space 12 for one person where one sauna user resides. Each of the spaces 12 is separated from each other by curtains or the like.

Below each of the multiple spaces 12 for a single user, a steam generator 30 is provided.

However, one of the multiple spaces 12 for a single user is configured as a water storage tank 21, which will be described later, and only this portion is not provided with the steam generator 30.

The fluid circulation generation device 100 in the present embodiment has a cooling tower 20 in which water flows down from the top toward the bottom, and a water supply pipe 22 that supplies water to the top of the cooling tower 20.

More specifically, in the center of the regular octagon, the cooling tower 20 is disposed. The cooling tower 20 cools steam in the vicinity of the cooling tower 20 by flowing water from the top toward the bottom so as to prevent dew condensation and implement convection of steam inside the sauna room 10.

The cooling tower 20 is configured at a height that reaches from the bottom surface of the sauna room 10 to the ceiling, and the water supply pipe 22 is disposed from the bottom to the top in the center of the cooling tower 20. The upper end of the water supply pipe 22 is open, so that water flows out at all times.

The periphery of the cooling tower 20 is configured as the storage tank 21 that stores water flowing down from the cooling tower 20. The periphery of the cooling tower 20 is communicated with substantially trapezoid-shaped areas that are configured as the spaces 12 for a single user, which are configured as the storage tank 21 by combining.

The storage tank 21 is provided with an overflow pipe (not depicted), and is configured so that the water level in the storage tank 21 is always constant.

Figure 2:
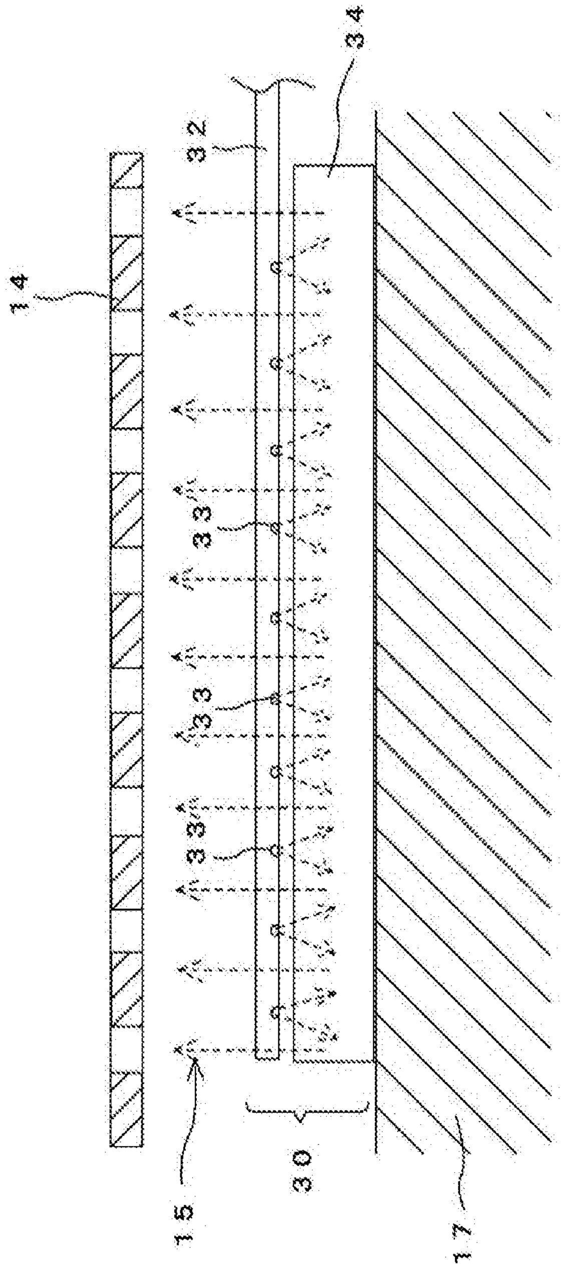
FIG. 2 is a side view of a usage space of a user.
Figure 3:
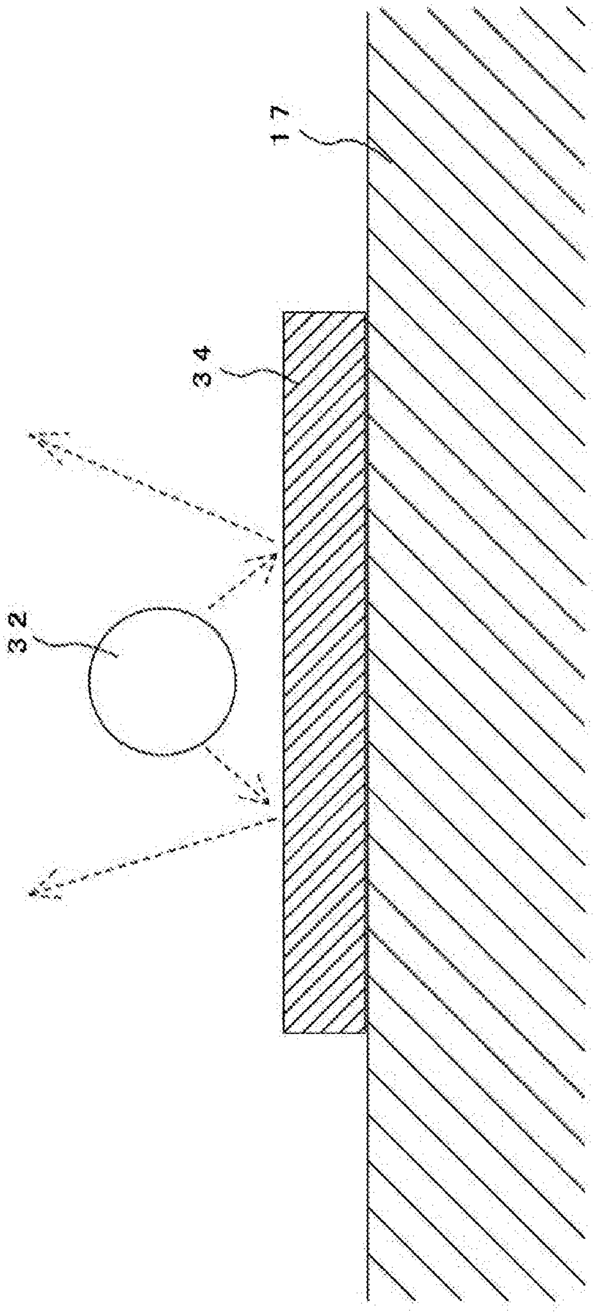
FIG. 3 is a front view of the usage space of the user.

FIG. 2 and FIG. 3 illustrate a side view and a front view of the space for a single user.

The floor surface of the space 12 for a single user is made up of a drainboard 14 in which wooden pieces of a predetermined width are disposed at regular intervals.

A concrete subfloor 17 is provided at a predetermined distance below the drainboard 14, and the space between the drainboard 14 and the subfloor 17 serves as a steam generating space 15. In each steam generating space 15, the steam generator 30 is provided, and the steam generated by the steam generator 30 rises through gaps of the drainboard 14.

The steam generator 30 has a steam supply pipe 32 and a ceramic plate 34 that is disposed below the steam supply pipe 32. The steam supply pipe 32 is connected to a steam generator (not depicted) such as a boiler provided outside the sauna room, and steam generated by the steam generator is supplied to the steam supply pipe 32.

In the steam supply pipe 32, a plurality of discharge holes 33 are formed downward along the length direction thereof, and steam is discharged downward from these discharge holes 33.

As in the present embodiment, by generating steam below the space 12 used by a user and making it rise through the gaps of the drainboard 14, a comfortable sauna space can be produced with a uniform temperature distribution in the height direction, not being in a state in which the feet are cold and the head is hot, which is often seen in general mist saunas.

The ceramic plate 34 is disposed below the steam supply pipe 32, and the steam discharged from the discharge hole 33 abuts on the ceramic plate 34, is reflected by the ceramic plate 34, and goes upward. As a result, because the steam does not directly abut on the human body, the danger of burns or the like can be eliminated. In addition, by abutting the steam on the ceramic plate 34 to heat the ceramic plate 34, far-infrared rays are also emitted from the ceramic plate 34, so that the user's body can be warmed from the core. The ceramic plate 34 may be not made up of a single ceramic plate 34 as illustrated in FIG. 2, and a plurality of ceramic plates 34 may be disposed at predetermined intervals.

In the present embodiment, as illustrated in FIG. 3, the ceramic plate 34 is in a flat-plate shape but is not limited to a flat-plate shape in particular.

Furthermore, the discharge holes 33 of the steam supply pipe 32 are formed obliquely downward on both the left and right sides when viewed from the front. Thus, as illustrated in FIG. 3, the steam is discharged obliquely downward and reflected at a predetermined angle by the ceramic plate 34. As a result, the steam can be supplied over a wide range.

The discharge holes 33 of the steam supply pipe 32 may be formed vertically downward, and the steam may be abutted perpendicularly on the surface of the ceramic plate 34.

Figure 4:
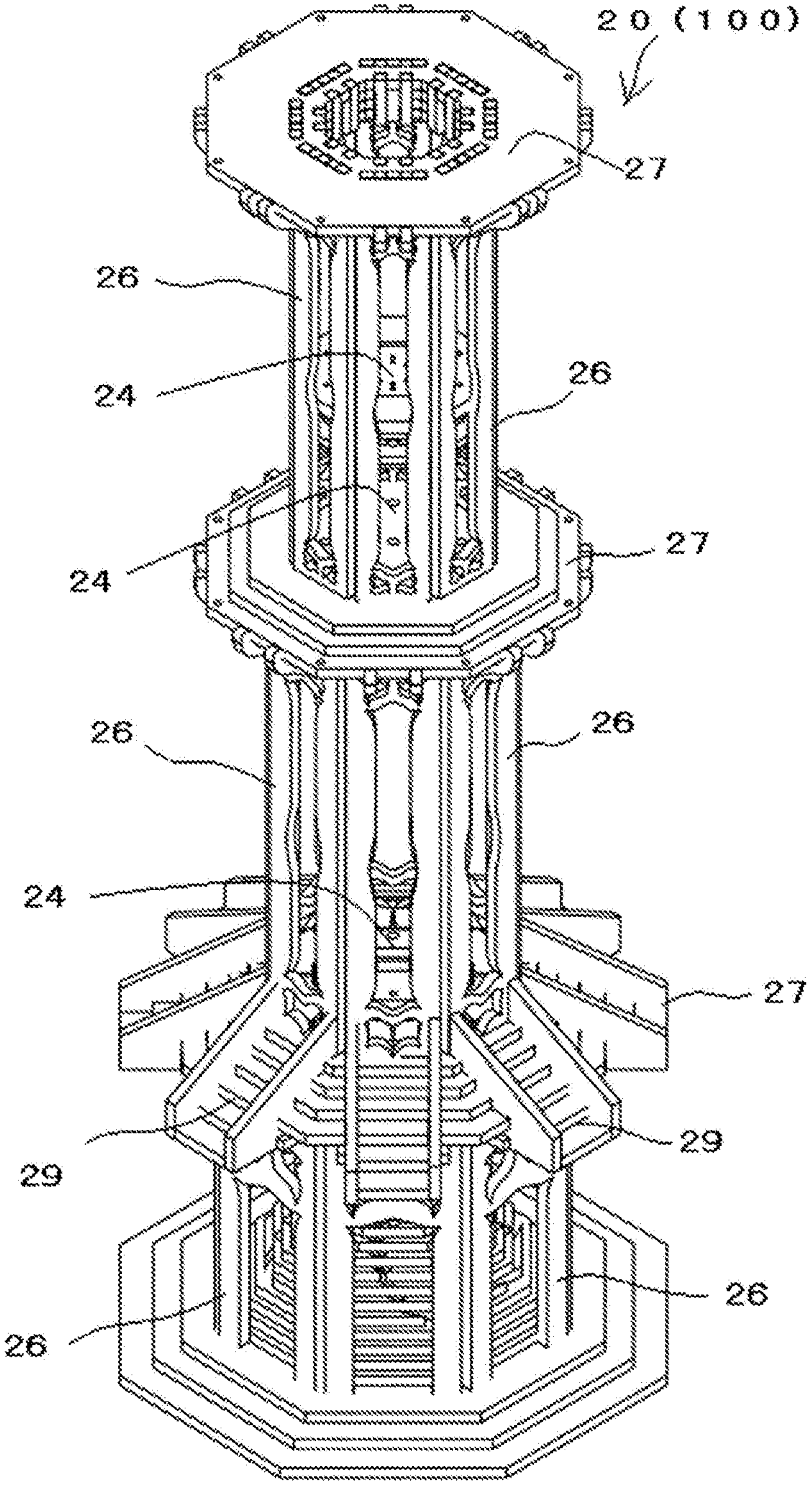
FIG. 4 is a perspective view of a cooling tower.
Figure 5:
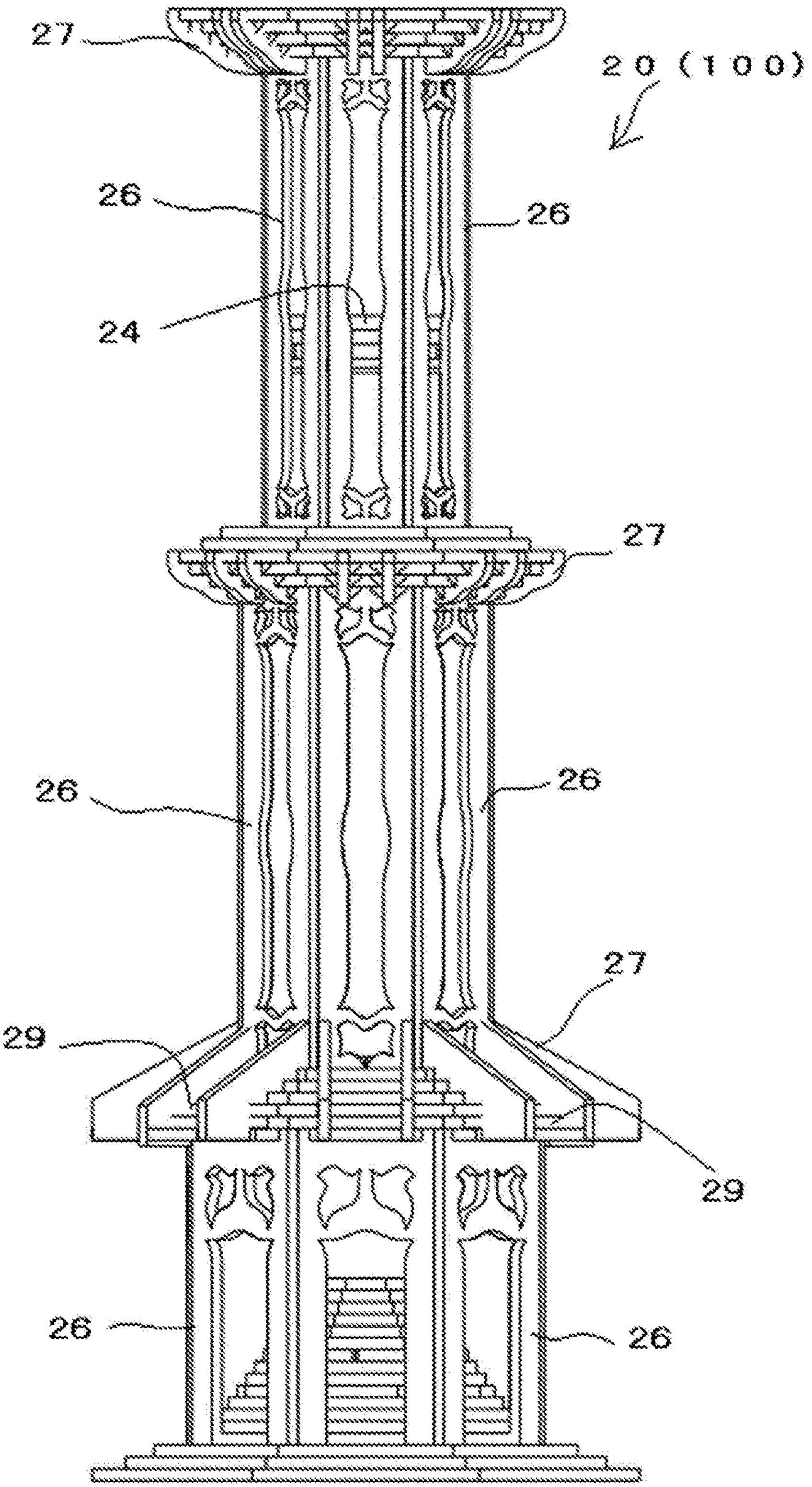
FIG. 5 is a side view of the cooling tower.
Figure 6:
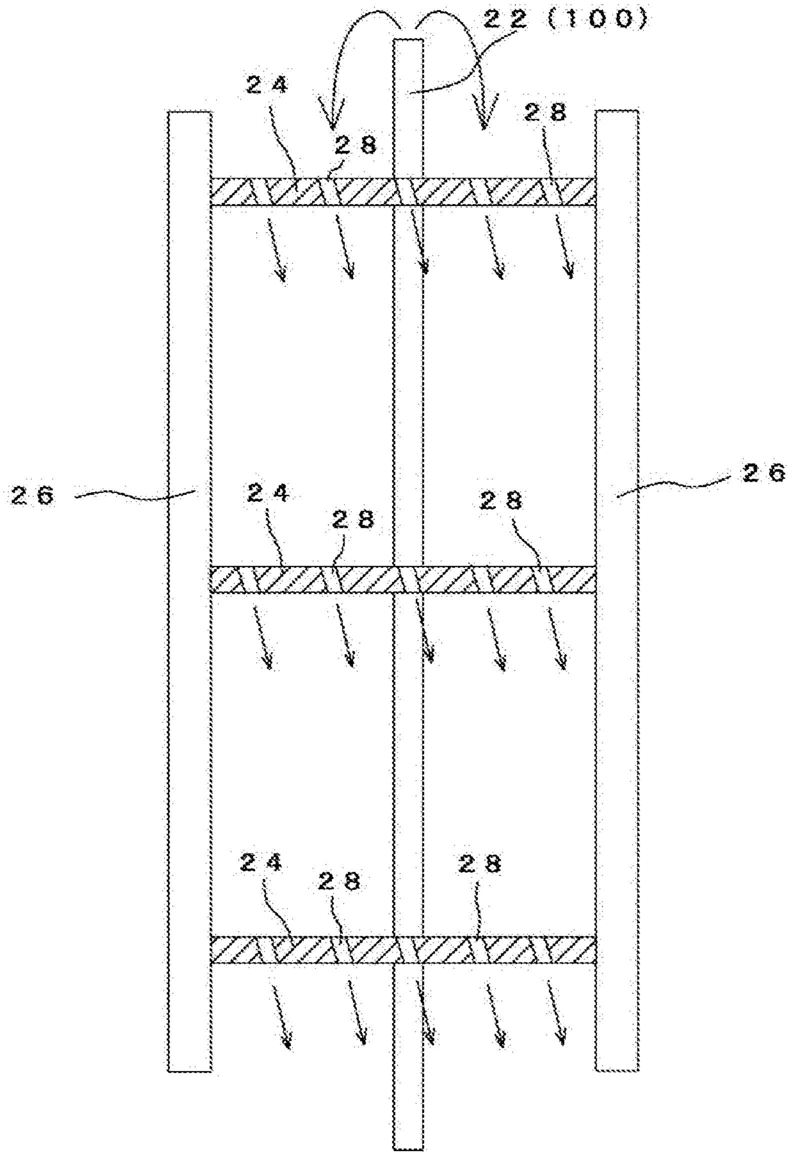
FIG. 6 is a cross-sectional view of receiver portions of the cooling tower.

FIG. 4 illustrates a perspective view of the cooling tower viewed obliquely from above, and FIG. 5 illustrates a side view of the cooling tower. FIG. 6 illustrates a schematic configuration diagram of the water supply pipe and the receiver portions of the cooling tower.

The cooling tower 20 in the present embodiment is entirely made up of transparent acrylic, but the material is not limited to acrylic, nor does it have to be transparent. However, by using transparent material, beauty can be produced by the reflection of light when the water flows down.

The external shape of the cooling tower 20 in the present embodiment has various designs and is shaped like a work of art, but is not limited to such a shape.

In the center of the cooling tower 20, the water supply pipe 22 extending in the vertical direction is disposed (not depicted in FIG. 4 and FIG. 5), and the upper end of the water supply pipe 22 is open. It is set so that the water flows out from this open upper end at all times. The outflow of water from the water supply pipe 22 does not need to flow out vigorously.

In the cooling tower 20, a plurality of receiver portions 24 are provided at predetermined intervals along the vertical direction, and a plurality of support columns 26 are provided so as to support the outer circumferential edges of the receiver portions 24. In each of the receiver portions 24, a plurality of water passage holes 28 to allow the water flowing out from the water supply pipe 22 to fall down are formed.

The water that flowed out from the upper end of the water supply pipe 22 falls off along the support column 26 or falls down through the water passage holes 28 in the receiver portions 24. That is, the water flows down from both the outside and the inside of the cooling tower 20.

Furthermore, flange portions 27 extending outward from the support columns 26 are provided at a plurality of places along the vertical direction. The flange portions 27 have a decorative purpose, but in particular, the staircase-shaped portions 29 allow the water that has flowed off along the support columns 26 to flow slowly and increase the contact area with the steam, thereby increasing the opportunities for the steam to come into contact with the water and improving the cooling efficiency of the steam.

The multiple water passage holes 28 formed in the receiver portion 24 are formed being not oriented vertically downward but inclined in a predetermined direction.

Figure 7:
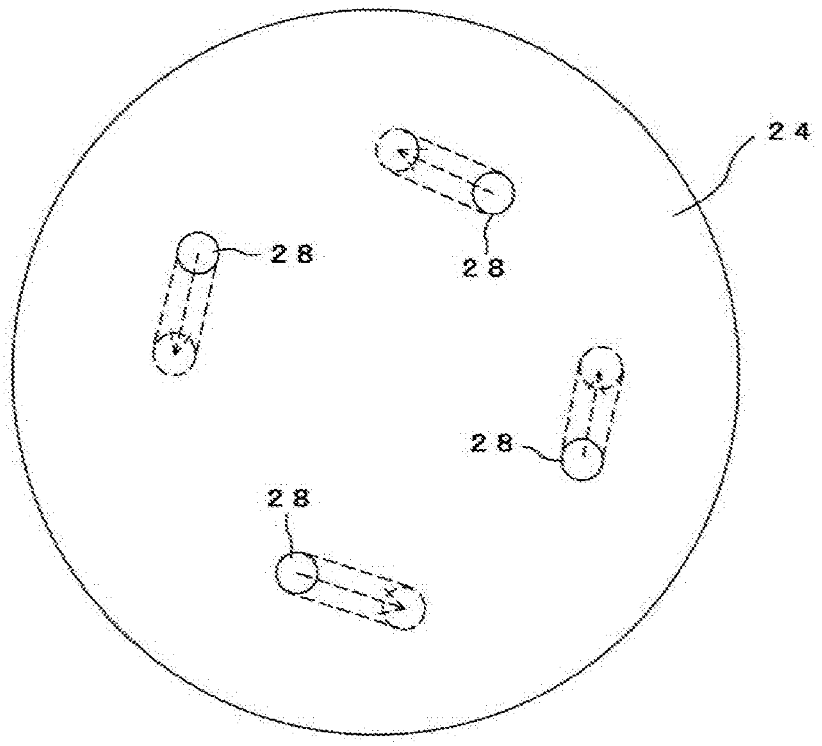
FIG. 7 is a plan view illustrating water passage holes in the receiver portion.

FIG. 7 illustrates an example of a plan view of the receiver portion. The water passage holes 28 in the present embodiment are formed such that the slope of the multiple water passage holes 28 is counterclockwise. Therefore, the water falling from the multiple water passage holes 28 in the receiver portion 24 falls counterclockwise. As a result, a counterclockwise rotational motion is also added to the steam that comes into contact with the water falling through the water passage holes 28.

As a configuration to rotate the water flowing down the cooling tower 20 counterclockwise, grooves may be formed at an angle on the surfaces of the multiple support columns 26 and/or the flange portions 27 (in a direction that is counterclockwise when viewed in planar view) so that the water flows down at an angle on the surfaces of the support columns 26 and/or the surfaces of the flange portions 27.

Furthermore, the staircase-shaped portions 29 in the flange portions 27 may be arranged such that each is in a counterclockwise orientation.

The configuration may be a combination of the sloping of the water passage holes 28 in the receiver portion 24, the configuration of forming diagonal grooves on the surfaces of the multiple support columns 26 and/or flange portions 27, and the configuration of arranging the staircase-shaped portions 29 in the flange portions 27 such that each is in a counterclockwise orientation.

In the present embodiment, the configuration in which the steam rotates counterclockwise inside the sauna room 10 is adopted, but it may be configured such that the steam rotates clockwise.

Figure 8:
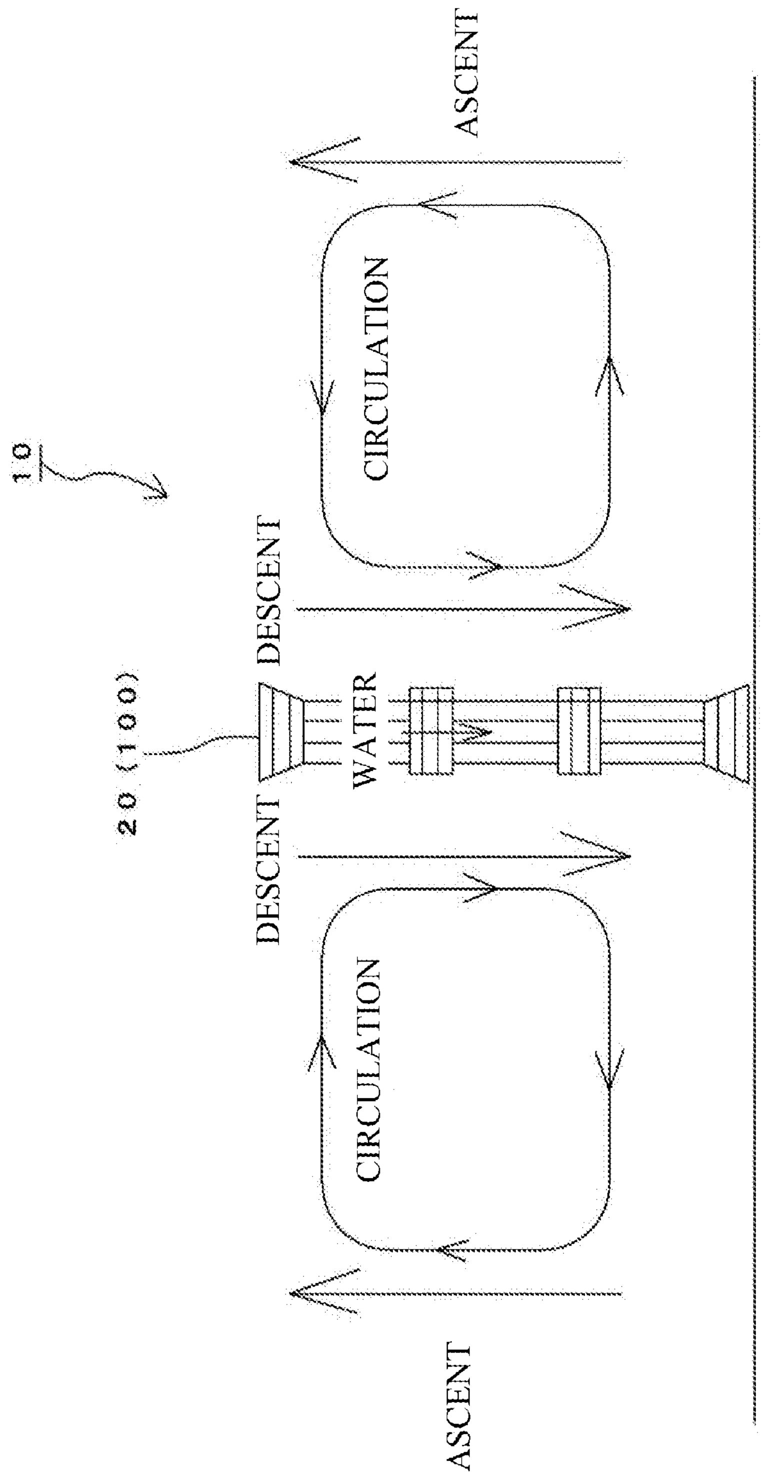
FIG. 8 is an explanatory diagram illustrating the circulation of steam in the vertical direction in the sauna room.
Figure 9:
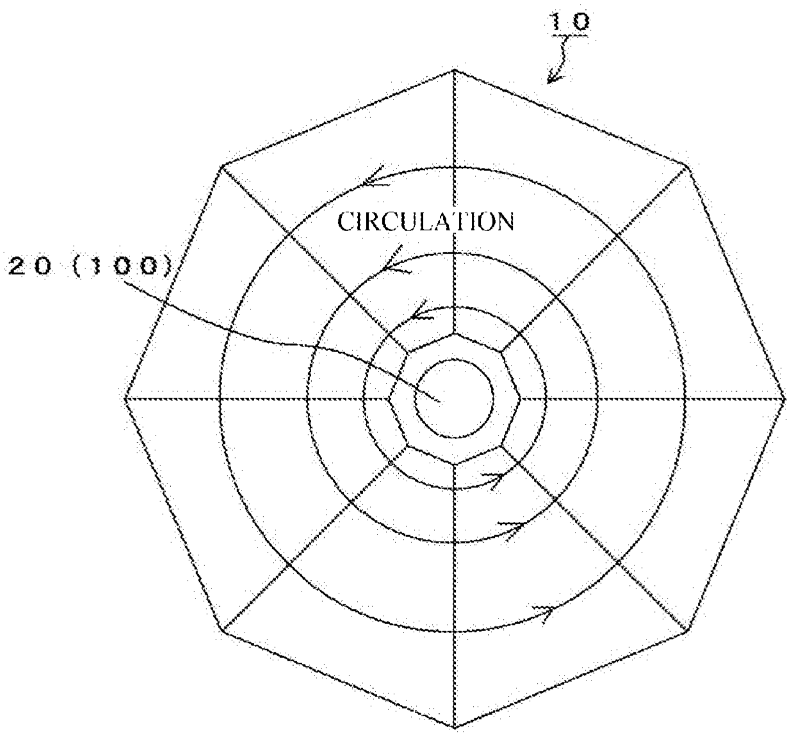
FIG. 9 is an explanatory diagram illustrating the circulation of steam in the horizontal direction in the sauna room.

FIG. 8 illustrates a schematic side view of the sauna room indicating the flow of air, and FIG. 9 illustrates a schematic plan view indicating the flow of air.

By flowing the water downward in the cooling tower 20 disposed in the center of the sauna room 10, the steam that has come in contact with the water is cooled and the steam that became heavy descends. The steam generated by the steam generator 30 is warm and thus rises. As a result, inside the sauna room 10, a circulation cycle of steam in the vertical direction, in which the steam descends in the central portion and rises on the outside, is generated.

By circulating the steam in this manner, the inconvenience of cold feet and hot head seen in general mist saunas can be eliminated, and a comfortable sauna space can be provided.

Moreover, the steam that has come in contact with the water is cooled in the cooling tower 20, and at that time, the steam condenses into liquid water and flows down together with the water in the cooling tower 20. In this way, the moisture in the air surrounding the cooling tower 20 is reduced, so that preventing dew condensation on the ceilings, walls, and the like can be achieved.

Then, in the receiver portions 24 of the cooling tower 20, the multiple water passage holes 28 are formed inclined counterclockwise when viewed in planar view, and the water falling from the multiple water passage holes 28 falls in a counterclockwise rotating manner. Therefore, a counterclockwise rotational motion around the cooling tower 20 is also added to the steam that comes in contact with the water falling through the water passage holes 28, so that a circulation of steam that is counterclockwise in the entire sauna room 10 is caused. As a result, temperature averaging inside the sauna room 10 can be achieved.

Separately from the steam generated by the steam generator 30, a mist supply pipe (not depicted) that supplies mist may be provided.

Second Embodiment

In the present embodiment, an embodiment of a sauna room 44 in the shape of a horizontally placed cylinder will be described.

Figure 10:
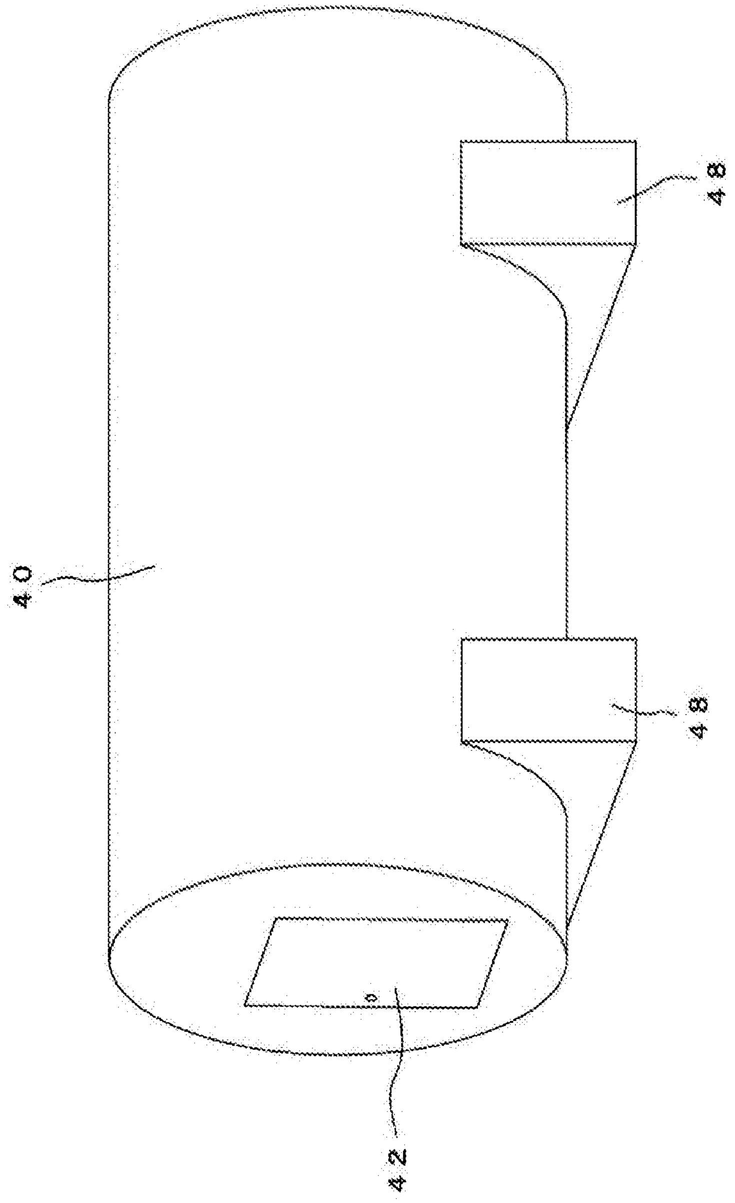
FIG. 10 is an external view of a sauna system of a second embodiment.
Figure 11:
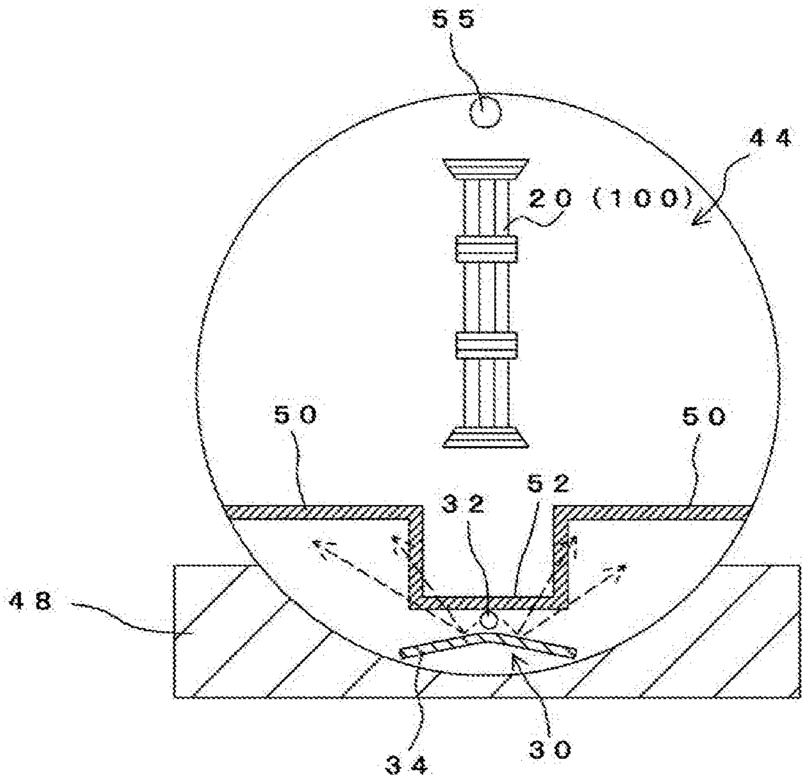
FIG. 11 is a front view of a sauna room of the second embodiment.
Figure 12:
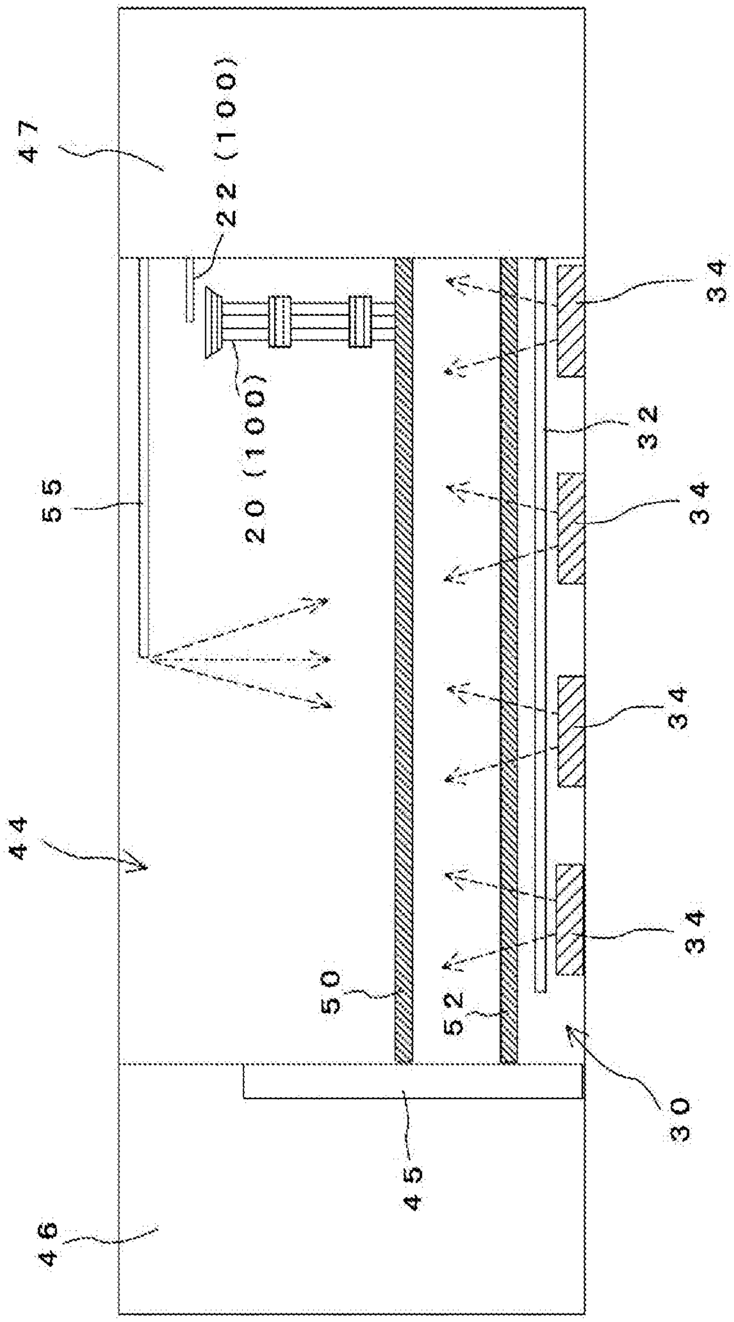
FIG. 12 is a side view of the sauna room of the second embodiment.

FIG. 10 illustrates the exterior shape of a sauna building of the present embodiment, FIG. 11 illustrates a front view of the inside of the sauna room 44, and FIG. 12 illustrates a side view of the inside of the sauna room 44.

A sauna building 40 in the present embodiment has the shape of a horizontally placed cylinder and incorporates all boilers and the like built in so that it can be installed independently of other buildings. On one end face of the sauna building 40, a door 42 for the entrance of users is provided.

The size of the sauna building 40 is assumed to have a total length of about 3200 mm and a diameter of about 2200 mm, and the central portion of about 1900 mm in the total length direction is the sauna room 44. The front side of the sauna room 44 is an entrance space 46, and the rear side of the sauna room 44 is a machine room 47 where the boilers or the like are installed. Between the entrance space 46 and the sauna room 44, provided is an inner door 45 for which a user goes in and out of the sauna room 44.

Furthermore, because the sauna building 40 is shaped like a horizontally placed cylinder, fixed blocks 48 for securing to the ground are provided, and the sauna building 40 is placed on the fixed blocks 48.

The sauna room 44 is shaped so that users can sit to face each other, and has seat portions 50 on which the user can sit or lie down and a bottom surface portion 52 provided below the seat portion 50 so that the feet are positioned when the user sits on the seat portion 50.

The seat portion 50 and the bottom surface portion 52 are made up of drainboards for which wooden pieces of a predetermined width are arranged at regular intervals.

The steam generator 30 is provided below the bottom surface portion 52, and steam generated by the steam generator 30 rises through the gaps of the drainboards of the seat portions 50 and the bottom surface portion 52.

The steam generator 30 has a steam supply pipe 32 and a ceramic plate 34 that is disposed below the steam supply pipe 32. The steam supply pipe 32 is connected to a steam generator (not depicted) such as a boiler, and steam generated by the steam generator is supplied to the steam supply pipe 32.

In the steam supply pipe 32, a plurality of discharge holes 33 are formed downward along the length direction thereof, and steam is discharged downward from these discharge holes 33.

As in the present embodiment, by generating steam below the space used by the user and making it rise through the gaps of the drainboards of the seat portions 50 and the bottom surface portion 52, a comfortable sauna space can be produced with a uniform temperature distribution in the height direction, not being in a state in which the feet are cold and the head is hot, which is often seen in general mist saunas.

The discharge holes 33 of the steam supply pipe 32 are formed obliquely downward on both the left and right sides when viewed from the front. The ceramic plate 34 of the present embodiment is formed in a mountain shape that protrudes toward the center in the width direction where the steam supply pipe 32 is located.

Thus, as illustrated in FIG. 11, the steam is discharged obliquely downward and is widely reflected from the center toward the outside by the ceramic plate 34. Therefore, because the steam is obliquely jetted from the ceramic plate 34 in the direction of not only the bottom surface portion 52 but also the seat portions 50, the steam can be supplied to the entire sauna room 44 even when the steam supply pipe 32 is provided at the center in the width direction.

The steam generator 30 is not limited to being provided below the bottom surface portion 52, but may be provided below each seat portion 50.

In the present embodiment, the cooling tower 20 is disposed on the rear side in the length direction, and water flows downward from the top of the cooling tower 20 as in the first embodiment.

The water supply pipe 22 to the cooling tower 20 may be provided at the top of the cooling tower 20 or, as in the first embodiment, be disposed through the inside of the cooling tower 20 from the bottom. Furthermore, the water supply pipe 22 is set so that water flows out from the opening at the upper end thereof at all times.

For the water flowed down from the cooling tower 20, a storage portion may be provided as in the first embodiment, but if the space for the storage portion cannot be allocated, a drain port (not depicted) is provided below the cooling tower 20 and the water is discharged to the outside of the sauna room 44 from the drain port without being stored.

The detailed structure of the cooling tower 20 is the same as that of the first embodiment, so the description thereof will be omitted.

However, because the cooling tower 20 is disposed on the rear side in the length direction in the present embodiment, there may be no configuration of circulating the steam counterclockwise around the cooling tower 20.

By providing the cooling tower 20 in the present embodiment also, by flowing the water downward in the cooling tower 20 disposed on the rear side of the sauna room 44, the steam that has come in contact with the water is cooled and the steam that became heavy descends. The steam generated by the steam generator 30 is warm and thus rises. As a result, inside the sauna room 10, a circulation cycle of steam in the vertical direction, in which the steam descends on the rear side and rises at the other locations, is generated.

By circulating the steam in this manner, the inconvenience of cold feet and hot head seen in general mist saunas can be eliminated, and a comfortable sauna space can be provided.

Moreover, the steam that has come in contact with the water is cooled in the cooling tower 20, and at that time, the steam condenses into liquid water and flows down together with the water in the cooling tower 20. In this way, the moisture in the air surrounding the cooling tower 20 is reduced, so that preventing dew condensation on the ceilings, walls, and the like can be achieved.

In the present embodiment, an example in which one cooling tower 20 is provided on the rear side in the length direction and at the center in the width direction of the sauna room 44 has been described, but the cooling tower 20 may be provided on the rear side of each of the two seat portions 50 in the length direction.

Separately from the steam generated from the steam generator 30, a mist supply pipe 55 may be provided. The mist supply pipe 55 jets water in the form of mist from a tank (not depicted) provided in the machine room 47.

Third Embodiment

In the present embodiment, in place of the fluid circulation generation device 100 having the cooling tower 20 and the water supply pipe 22 in the first embodiment, a case of having a first transport pipe 60 and a second transport pipe 62 will be described. The configuration other than the first transport pipe 60 and the second transport pipe 62 is the same as that of the first embodiment, so the description may be omitted.

Figure 13:
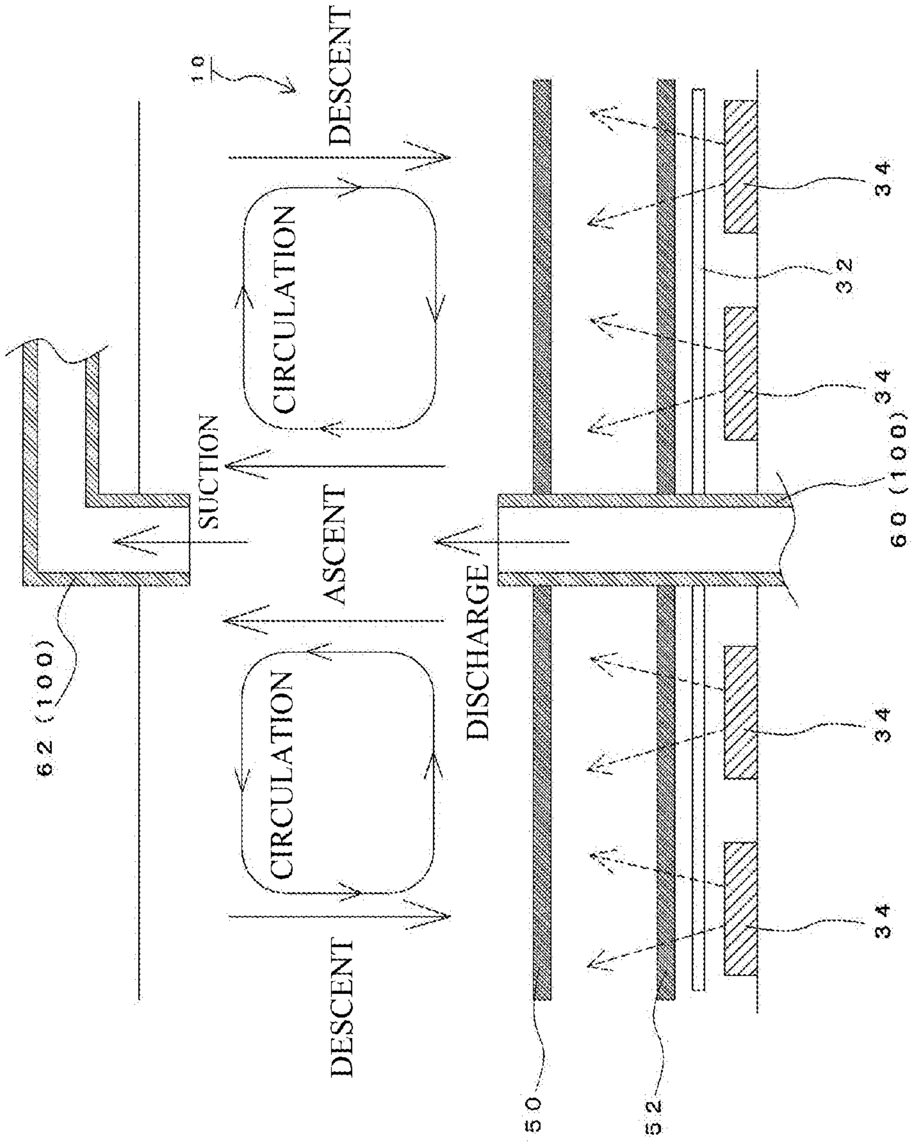
FIG. 13 is a side view of a sauna room of a third embodiment.

FIG. 13 illustrates a side view of a sauna room 10 of the present embodiment.

The first transport pipe 60 is positioned at the center in planar view of the sauna room 10, which has a regular octagonal shape in planar view, and is configured to discharge gas (air) that has a temperature lower than the room temperature of the sauna room 10 upward from the lower portion of the sauna room 10.

In FIG. 10, a discharge port of the first transport pipe 60 is positioned above the seat portion 50, but is not limited thereto.

The first transport pipe 60 is formed of a metallic material (such as stainless alloy), as an example, and has a pipe diameter of several centimeters to several tens of centimeters.

The first transport pipe 60 is connected to a known blower or the like (not depicted) provided inside or outside the sauna room 10, and discharges gas (air) into the sauna room 10. The gas (air) only needs to have a temperature lower than the room temperature of the sauna room 10, and may even be outside air.

The second transport pipe 62 is positioned at the center in planar view of the sauna room 10, which has a regular octagonal shape in planar view, and is configured to suck gas (air) in the sauna room 10 from the upper portion of the sauna room 10.

A suction port of the second transport pipe 62 only needs to be positioned opposite to the discharge port of the first transport pipe 60 and above the discharge port of the first transport pipe 60, but being positioned closer to the ceiling of the sauna room 10 is more preferable.

The second transport pipe 62 is formed of a metallic material (such as stainless alloy), as an example, and has a pipe diameter of several centimeters to several tens of centimeters.

The second transport pipe 62 is connected to a known ventilator or the like (not depicted) provided inside or outside the sauna room 10, and sucks the gas (air) in the sauna room 10.

The second transport pipe 62 may be connected to a known dehumidifier (not depicted) in place of a ventilator, in which case the air at the ceiling of the sauna room 10 can be dehumidified, further preventing dew condensation on the ceiling of the sauna room 10.

The first transport pipe 60 and the second transport pipe 62 may be configured as a single air conditioning system, in which case the first transport pipe 60 and the second transport pipe 62 are connected to a known air conditioner or the like (not depicted) provided inside or outside the sauna room 10.

The first transport pipe 60 discharges gas (air) having a temperature lower than the room temperature of the sauna room 10 from the lower portion of the sauna room 10, and the second transport pipe 62 sucks the gas inside the sauna room 10 from the upper portion of the sauna room 10, so that, at the central portion of the sauna room 10 in planar view, the gas (air) rises. Then, because the temperature is lower toward the lower portion of the sauna room 10, the gas (air) descends on the wall surface side of the sauna room 10. As a result, the steam is circulated in the vertical direction in the sauna room 10, so that preventing dew condensation on the ceiling and wall surfaces of the sauna room 10 can be achieved.

Fourth Embodiment

In the present embodiment, in place of the fluid circulation generation device 100 having the cooling tower 20 and the water supply pipe 22 in the second embodiment, a case of having the first transport pipe 60 and the second transport pipe 62 in the third embodiment will be described. The configuration other than the first transport pipe 60 and the second transport pipe 62 is the same as that of the second embodiment, so the description may be omitted.

Figure 14:
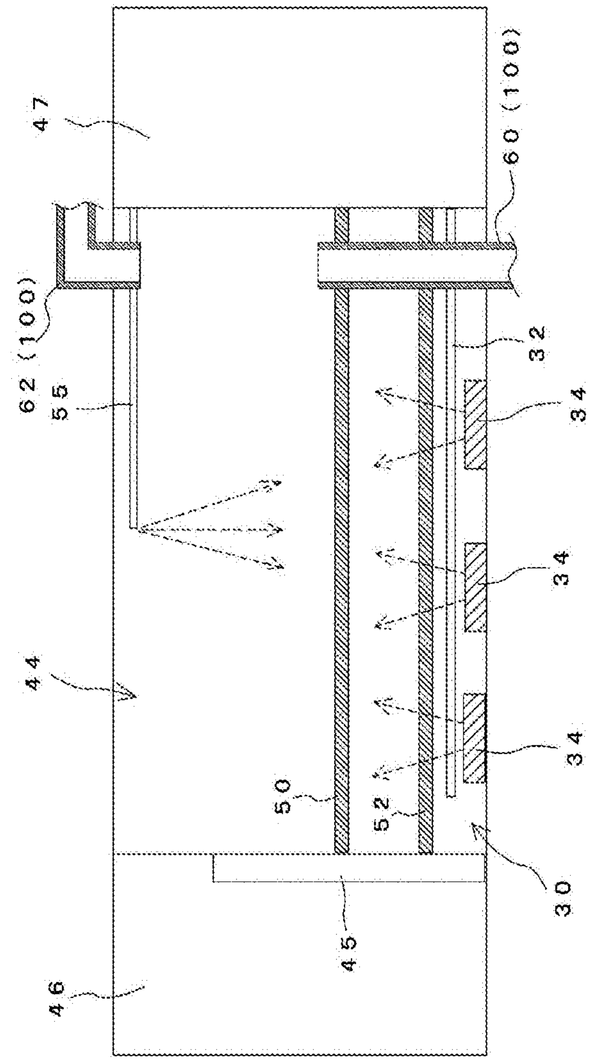
FIG. 14 is a side view of a sauna room of a fourth embodiment.

FIG. 14 illustrates a side view of a sauna room 44 of the present embodiment.

In the present embodiment, the first transport pipe 60 and the second transport pipe 62 are disposed on the rear side in the length direction of the sauna room 44, and as in the third embodiment, it is configured such that the first transport pipe 60 discharges gas (air) having a temperature lower than that of the sauna room 44 upward from the lower portion of the sauna room 44 and the second transport pipe 62 sucks the gas (air) inside the sauna room 44 from the upper portion of the sauna room 44.

With the above-described configuration, the gas (air) rises on the rear side in the length direction of the sauna room 44. Then, because the temperature is lower toward the lower portion of the sauna room 44, the gas (air) descends on the wall surface side (in FIG. 14, inner door 45 side) of the sauna room 10. As a result, the steam is circulated in the vertical direction in the sauna room 44, so that preventing dew condensation on the ceiling and wall surfaces of the sauna room 44 can be achieved.

In the present embodiment, an example in which a set of the first transport pipe 60 and the second transport pipe 62 is provided on the rear side in the length direction of the sauna room 44 and at the center in the width direction has been described, but a set of the first transport pipe 60 and the second transport pipe 62 may be provided on the rear side in the length direction of each of the two seat portions 50.

Fifth Embodiment

In the present embodiment, in place of the fluid circulation generation device 100 having the cooling tower 20 and the water supply pipe 22 in the first embodiment, a case of having an ultrasonic atomization device 70 will be described. The configuration other than the ultrasonic atomization device 70 is the same as that of the first embodiment, so the description may be omitted.

Figure 15:
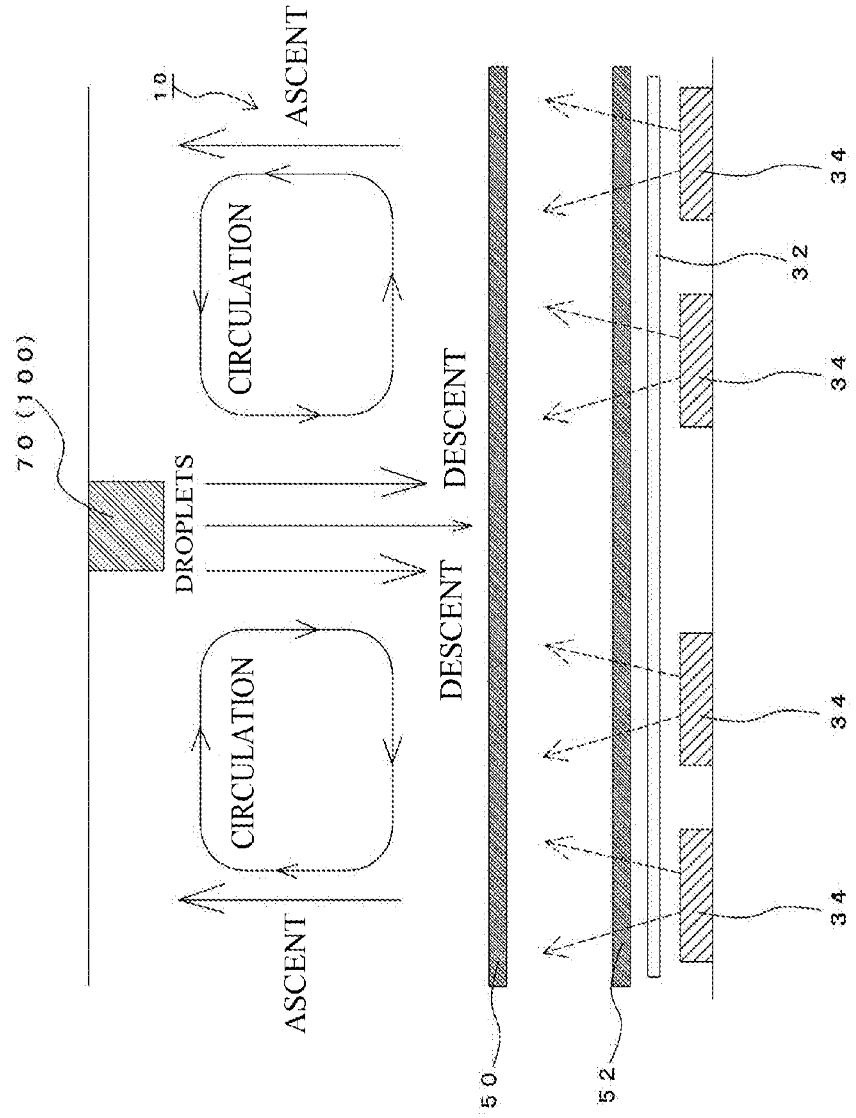
FIG. 15 is a side view of a sauna room of a fifth embodiment.

FIG. 15 illustrates a side view of the sauna room 10 of the present embodiment.

The ultrasonic atomization device 70 is positioned at the upper portion of the sauna room 10 and at the center in planar view of the sauna room 10, which has a regular octagonal shape in planar view, and is configured to circulate steam inside the sauna room 10 by condensing the steam inside the sauna room 10 and causing droplets to fall from the upper portion of the sauna room 10.

The ultrasonic atomization device 70 has, as an example, an ultrasonic transducer element and an ultrasonic vibration surface that vibrates by ultrasonic waves, and is a known ultrasonic atomization device 70 that atomizes (mists) liquid attached to the vibrating ultrasonic vibration surface.

The ultrasonic atomization device 70 is connected to a power supply (not depicted) provided inside or outside the sauna room 10.

It is more preferable as the ultrasonic atomization device 70 is positioned closer to the ceiling of the sauna room 10.

Moreover, directly below the ultrasonic atomization device 70, a storage tank (not depicted) for storing the falling droplets may be provided. In this case, the storage tank may be provided with an overflow pipe (not depicted) so that the water level is always constant.

With the above-described configuration, the steam in the upper portion of the sauna room 10 is condensed by the ultrasonic atomization device 70 and falls down (drops) as droplets. Furthermore, on the wall surface side of the sauna room 10, the steam rises.

Thus, steam is circulated in the vertical direction in the sauna room 10. Consequently, even in a configuration in which the fluid circulation generation device 100 has the ultrasonic atomization device 70, dew condensation on the ceiling and wall surfaces of the sauna room can be prevented.

Sixth Embodiment

In the present embodiment, in place of the fluid circulation generation device 100 having the cooling tower 20 and the water supply pipe 22 in the second embodiment, a case of having the ultrasonic atomization device 70 in the fifth embodiment will be described. The configuration other than the ultrasonic atomization device 70 is the same as that of the second embodiment, so the description may be omitted.

Figure 16:
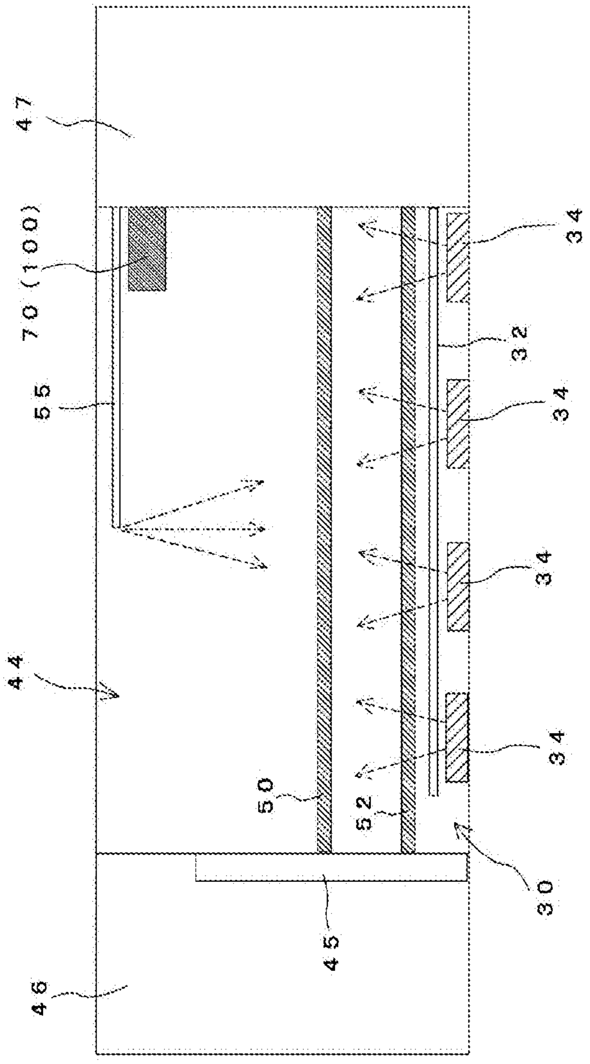
FIG. 16 is a side view of a sauna room of a sixth embodiment.

FIG. 16 illustrates a side view of the sauna room 44 of the present embodiment.

In the present embodiment, the ultrasonic atomization device 70 is positioned at the upper portion of the sauna room 44 and on the rear side in the length direction of the sauna room 44, and as in the fifth embodiment, the ultrasonic atomization device 70 is configured to circulate steam inside the sauna room 44 by condensing the steam in the sauna room 44 and causing droplets to fall from the upper portion of the sauna room 44.

The ultrasonic atomization device 70 is connected to a power supply (not depicted) provided inside or outside the sauna room 44 (as an example, inside the machine room 47).

Furthermore, directly below the ultrasonic atomization device 70, a storage tank (not depicted) for storing the falling droplets may be provided. In this case, the storage tank may be provided with an overflow pipe (not depicted) so that the water level is always constant.

With the above-described configuration, the steam in the upper portion of the sauna room 44 is condensed by the ultrasonic atomization device 70 and falls down (drops) as droplets. Furthermore, on the wall surface side of the sauna room 44 (in FIG. 16, inner door 45 side), steam rises. Thus, steam is circulated in the vertical direction in the sauna room 44. Consequently, even in a configuration in which the fluid circulation generation device 100 has the ultrasonic atomization device 70, dew condensation on the ceiling and wall surfaces of the sauna room can be prevented.

In the present embodiment, an example in which one ultrasonic atomization device 70 is provided on the rear side in the length direction and at the center in the width direction of the sauna room 44 has been described, but the ultrasonic atomization device 70 may be provided on the rear side of each of the two seat portions 50 in the length direction.

What is claimed is:

1. A sauna system comprising:

a sauna room including a space in which a user is able to enter and exit;

a steam supply pipe configured to supply steam into the sauna room; and a fluid circulation generation device disposed at a predetermined position inside the sauna room, wherein the fluid circulation generation device is configured to circulate steam in a vertical direction inside the sauna room, and wherein the fluid circulation generation device includes a cooling tower in which water flows downward from a top to a bottom, and a water supply pipe configured to supply water to the top of the cooling tower.

2. The sauna system according to claim 1, wherein the cooling tower includes:

a plurality of receiver portions arranged at predetermined intervals in the vertical direction; and a plurality of support columns supporting outer circumferential edges of the receiver portions, wherein the receiver portions have a plurality of water passage holes for causing water flowed out from the water supply pipe to drop.

3. The sauna system according to claim 2, wherein the water passage holes in the receiver portions are formed such that vertical axes are inclined clockwise or counterclockwise when viewed in planar view.

4. The sauna system according to claim 2, wherein the water supply pipe is disposed through a center of the receiver portions from a lower side toward an upper side, and an opening is provided above an uppermost one of the receiver portions.

5. The sauna system according to claim 3, wherein the water supply pipe is disposed through a center of the receiver portions from a lower side toward an upper side, and an opening is provided above an uppermost one of the receiver portions.

6. The sauna system according to claim 1, wherein the fluid circulation generation device includes a first transport pipe configured to discharge gas from a lower portion of the sauna room into the sauna room and a second transport pipe configured to suck gas inside the sauna room from an upper portion of the sauna room, and wherein the gas discharged from the first transport pipe has a temperature lower than a room temperature of the sauna room.

7. The sauna system according to claim 1, wherein the fluid circulation generation device includes an ultrasonic atomization device provided in an upper portion of the sauna room, and wherein the ultrasonic atomization device is configured to circulate steam in the vertical direction in the sauna room by condensing steam in the sauna room and causing droplets to fall from the upper portion of the sauna room.

8. The sauna system according to claim 1, wherein the sauna room has a floor surface formed in a drainboard shape, wherein the steam supply pipe has a steam discharge hole disposed below the floor surface in the drainboard shape and formed so as to discharge steam downward, and wherein a ceramic plate that is disposed below the steam supply pipe and on which steam discharged from the discharge hole of the steam supply pipe abuts is provided.

9. The sauna system according to claim 1, wherein the sauna room is formed in a polygonal shape in planar view, and the fluid circulation generation device is disposed at center of the polygon.

10. The sauna system according to claim 9, wherein each space separated by straight lines extending from a vertex of the polygonal shape toward the center of the polygon is provided as a usage space for a user.

* * * * *